US009706092B1

(12) United States Patent
Tam et al.

(10) Patent No.: US 9,706,092 B1
(45) Date of Patent: Jul. 11, 2017

(54) IMAGER MODULE WITH CASTELLATED INTERPOSER CHIP

(71) Applicant: Amazon Technologies, Inc., Seattle, WA (US)

(72) Inventors: Samuel Waising Tam, Daly City, CA (US); Tak Shing Pang, Hong Kong (CN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/642,460

(22) Filed: Mar. 9, 2015

(51) Int. Cl.
H04N 5/335 (2011.01)
H04N 5/225 (2006.01)

(52) U.S. Cl.
CPC ................. H04N 5/2254 (2013.01)

(58) Field of Classification Search
None
See application file for complete search history.

(56) References Cited

U.S. PATENT DOCUMENTS

| 6,686,667 B2 | 2/2004 | Chen et al. |
| 6,873,024 B1 | 3/2005 | Prabhu et al. |
| 2008/0211043 A1* | 9/2008 | Chen ..................... B81B 7/0067 257/415 |
| 2009/0244356 A1* | 10/2009 | Cheng ................... H02K 11/01 348/345 |
| 2009/0296360 A1* | 12/2009 | Doblar ................ H05K 7/1061 361/767 |
| 2010/0053391 A1* | 3/2010 | Huang ................ H04N 5/2251 348/294 |
| 2013/0285180 A1* | 10/2013 | Wang ............... H01L 27/14618 257/432 |

* cited by examiner

Primary Examiner — Stephen Coleman
(74) Attorney, Agent, or Firm — Eversheds Sutherland (US) LLP

(57) ABSTRACT

An imager module having an interposer chip with castellated contacts electrically connected to and routing signals between an image sensor, a printed circuit board (PCB), and a voice coil motor (VCM) is disclosed. The VCM may be electrically coupled to the interposer chip via the castellated contacts. The castellated contacts may be formed by fabricating annular through silicon vias (TSVs) and then sawing through those annular TSVs. In some example embodiments, one or more surface mount devices (SMDs) may further be attached to the interposer chip with castellated contacts. The interposer chip may further have a cavity therein within which the image sensor may be attached.

20 Claims, 11 Drawing Sheets

IMAGER MODULE WITH CASTELLATED INTERPOSER CHIP

BACKGROUND

Imaging systems with semiconductor image sensors (e.g., charge coupled device (CCD) image sensors, complementary metal oxide semiconductor (CMOS) image sensors, etc.) may be incorporated in user devices such as smartphones and tablet computing devices. Often times, the form factor of these user devices are aggressively designed. Therefore, the volume of space available for imaging systems within these user devices may be limited. Furthermore, these types of user devices may be subject to vibration and/or mechanical shock (e.g., a user drops his/her smartphone with an imaging system).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Figure 1:
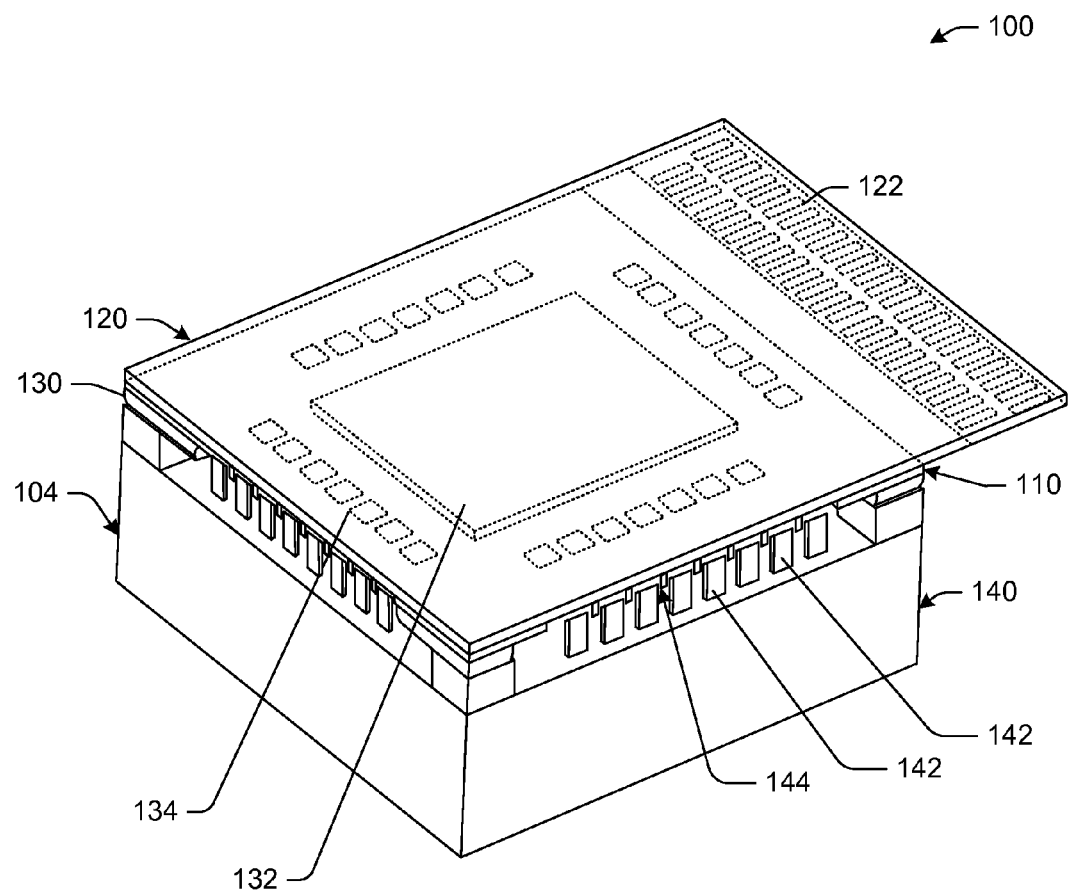
FIG. 1 is a schematic diagram illustrating a perspective view of an example imager module with a castellated interposer chip, in accordance with example embodiments of the disclosure.

Example embodiments of the present disclosure are directed to, among other things, an imager module for capturing digital images. In example embodiments, the imager module may have a relatively compact form factor and may be relatively robust to thermal cycling, vibrations, or other modes of failure. The imager module, in example embodiments, may include an interposer chip, such as a silicon interposer chip, with edge contacts with a castellated shape, on which an image sensor, a lens holder with a lens assembly, a voice coil motor (VCM), and a printed circuit board (PCB) may be attached to form the imager module. The castellated contacts at the edge of the interposer chip may be used to make electrical and mechanical contact with electrical pins (e.g., electrical leads of pin contacts) of the VCM. Additionally, the interposer chip may have a cavity provided therein within which the image sensor may be disposed. The VCM may receive control signals via the interposer chip and the castellated contacts thereon to move the lens assembly for the purposes of providing auto-focus functionality to the imager module. The image sensor may be electrically connected to the interposer chip using wire bonds, flip chip, or any other suitable electrical connection. The interposer chip may be configured to route and/or fan out signals to/from the image sensor to the PCB via bond pads disposed on the interposer chip. The interposer chip may be attached to the PCB by any suitable mechanism, such as by anisotropic conductive paste (ACP).

The castellated edge electrical contacts may provide for a more robust electrical contact and/or more robust manufacturing process when the VCM is attached to the interposer chip. In some cases, the electrical contacts of the VCM may be uneven, not completely straight, and possible non-uniform in dimension. The castellated contacts on the interposer chip, as described herein, may be more accommodative of non-uniformity in the electrical contacts associated with the VCM, either or both during operation and/or manufacture.

The castellated contacts of the interposer chip may be fabricated, in example embodiments, using processes that may be used for the formation of through silicon vias (TSVs). The process flow for forming the castellated edge contacts may include forming annular TSVs (e.g., annular hole formed and filled with a conductor) along a periphery of an interposer die, removing the donut center Si from the annular TSVs, and during singulation of the interposer die, cutting through the annular TSV with an open center. The singulation process may entail making two or more saw cuts down each of the saw streets of a wafer on which the interposer die is fabricated. Furthermore, in example embodiments, the singulation process may be performed in a manner where relatively low levels of chipping or other edge defects are experienced on the interposer die. The interposer die may already have one or more interconnection traces thereupon, on either one or both sides of the interposer die. In some example embodiments, the interposer die may have TSVs for the purpose of routing electrical signals from one side of the interposer die to the other side. In other example embodiments, the interposer die may not have any through contacts, such as TSVs for signal routing.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

FIG. 1 is a schematic diagram illustrating a perspective view of an example imager module 100 with a castellated interposer chip 110, in accordance with example embodiments of the disclosure. The interposer chip 110, as depicted, may be electrically and mechanically connected, on a first side, to a PCB 120 that may have one or more contacts 122 thereon to evacuate electrical signals, such as image sensor signals, from the imager module 100. The interposer chip 110 may have one or more bond pads 134 on the first side to make electrical contact to corresponding bond pads of the PCB 120. An image sensor 132 may also be electrically and mechanically connected to the interposer chip 110 on a second side of the interposer chip 110. The interposer chip 110 may further be attached, on the second side, to a lens assembly 130. The imager module 100 may further have a voice coil motor (VCM) 140 or other electromechanical device electrically and mechanically coupled to the interposer chip 110 to move the lens assembly 130 for the purpose of focusing an image on photosensitive elements of the image sensor 132. The VCM 140 may have electrical contacts 142 that may make electrical and mechanical contact with castellated or partially castellated contacts 144 of the interposer chip when the imager module 100 is assembled. The imager module 100 without the PCB 120 may be referred to as the imager assembly 104, in example embodiments.

The interposer chip 110 may, in example embodiments, be fabricated from an interposer die, as will be described in greater detail with reference to FIGS. 7-10. The interposer die may be fabricated, in example embodiments, from silicon (Si), such as Si wafers of any suitable size (e.g., 4 inch diameter, 6 inch diameter, etc.) and orientation (e.g., [100], [110], etc.). In other example embodiments, the interposer die may be fabricated from non-Si rigid materials, such as glass, quartz, III-V semiconductor substrates (e.g., GaAs, InP, etc.), or sapphire.

In some example embodiments, the interposer die may have interconnects (e.g., metallic traces) thereon for routing electrical signals, such as electrical signals from the PCB 120, the image sensor 132, the VCM 140, and/or discrete electronic devices that may be disposed on the interposer chip 110 and/or the PCB 120. The interposer die may have one or more levels of metallic interconnects on one or both sides of the interposer die. The interconnect metal traces and/or vias on one or both of the sides of the interposer die may be fabricated using any suitable processes and any suitable materials. The interconnect metal traces may be fabricated by either subtractive metallization processes (e.g., Al physical vapor deposition (PVD)/plasma etch) or by inlaid processes (e.g., Cu damascene integration). In some cases, both subtractive and inlaid processes may be used, such as on different layers of interconnects. In some example embodiments, bond pads 134 may be formed on one or both sides of the interposer die, such as in the top layer of metallic interconnect on either side of the interposer die. These bond pads 134 may enable the electrical and mechanical attachment of a variety of elements onto the interposer chip 110, such as the image sensor 132 and the PCB 120. The bond pads may be used for forming joints, or otherwise electrically and mechanically joining bonding elements of electrical components. Any suitable mechanism may be used for joining components onto the interposer die, such as flip-chip, thermo-sonic bonding, thermo-compression bonding, solder bonding, wire bond, ACP, non-conductive paste (NCP), wedge bonding, combinations thereof, or the like.

In some example embodiments, the interposer chip 110 may have discrete electronic devices, such as surface mount devices (SMDs) disposed thereon. In other words, one or more SMDs may be electrically and mechanically attached to one or both surfaces of the interposer chip 110, in example embodiments, such as by surface mount technology (SMT). These components may be attached to the interposer chip using any suitable surface mount mechanism, such as pick-and-place with thermo-compression solder joints or thermo-sonic gold-to-gold (Au/Au) bonding. In the embodiments where SMT is performed on the interposer die, the interposer chip 110 may have molding thereon for protecting the SMDs. The molding may be made of thermosetting polymer materials, in example embodiments. In other example embodiments, the interposer chip 110 may not have any SMDs thereon, and instead, one or more SMDs may be provided on the PCB 120, such as on one or both sides of the PCB 120. In these example embodiments, the processes performed on the interposer chip 110 may be fewer than the processes if the SMDs are directly provided on the interposer chip 110.

The PCB 120 or flexible printed circuit (FPC) may be made of any suitable material, such as FR-4, laminate, polyimide, or other electrical substrate materials. The PCB 120, in example embodiments, may be configured to provide electrical signals to and from the imager module 100, such as via electrical contacts 122 and bond pads 134. For example, the PCB may be configured to receive and/or send electrical signals from and/or to the processor(s) 120 of the user device 100. The PCB 120 may be connected to one or more other PCBs, such as a main board or mother board of the user device 100, such as a smartphone, tablet computing device, laptop computer, wearable device, or the like. The PCB 120 may be electrically connected to other electrical boards and/or devices via the electrical contacts 122 by any suitable mechanism, such as solder connections, ribbon connectors, and/or connector modules. The PCB 120 may be configured to receive and route image sensor control signals, such as from the processor(s) 120 external to the imager module 100, to the image sensor 132 via the interposer chip 110. The PCB 120 may further be configured to receive and route autofocus (AF) control signals, such as from an autofocus controller or other processor, to the VCM 140 via the interposer chip 110 to enable autofocus of the imager module 100 by moving the lens assembly 130. The PCB 120 may still further be configured to route image signals generated by the image sensor 132, by capturing an image, to entities external to the imager module 100, such as an external processor.

The lens assembly 130 may include one or more optical elements, such as one or more lenses and/or mirrors. In some example embodiments, the lens assembly 130 may include a single lens. The lens assembly 130 and/or lenses therein may be moved (e.g., displaced from a quiescent point) by the VCM 140. The lens assembly 130 may be mechanically attached to the interposer chip 110, by any suitable mechanism, including, for example epoxy material. The lens assembly 130 may be aligned, such as by a pick-and-place process performed by a pick-and-place system, over the hole in the interposer chip 110 through which light travels to impinge on the photosensitive array of pixels of the image sensor 132. The lens assembly 130, in example embodiments, may be configured to collect and direct light from an object to be imaged by the imager module 110 to the image sensor 132. In example embodiments, the lens assembly 130 may be attached to the interposer chip 110 on the opposite side of the interposer chip 110 than the side on which the image sensor 132 is attached. In this way, light from the object to be imaged may be focused by the lens assembly 130 and travel through the space of the cavity in the interposer chip 110 to impinge on the photosensitive pixels of the image sensor 132.

The VCM 140 may be mechanically coupled to the lens assembly 130 and electrically coupled to the interposer chip 110 and may be configured to receive one or more AF control signals and move the lens assembly 130 based at least in part on the received AF control signals. The VCM 140 may be electrically coupled by electrical contacts to the interposer chip 110, in example embodiments, on a side opposite the side on which the PCB 120 and the image sensor 132 are electrically coupled. It will be appreciated that while the lens assembly 130 autofocus is described with relation to the VCM 140, any suitable electromechanical device that may be used to displace the lens assembly 130 may be used. Other electromechanical devices may include piezomotors, MEMS based deflectors, or the like.

The interposer die, in some example embodiments, may further include one or more TSVs for making electrical contacts through the interposer die from one side to the other side. The TSV may be fabricated in the interposer die by any variety of suitable processes. These processes may include processes for making the TSV holes, electrically and/or chemically insulating the TSV holes, and/or filling and/or making contact to the TSV holes. In some example embodiments, the TSVs may underlie other interconnect metal layers of the interposer chip 110, such as bondpads. In other example embodiments, the ends of the TSVs may form electrical surfaces onto which other electrical components may be attached, such as by flip-chip, wirebond, or ACP.

As depicted in FIG. 1, the interposer chip 110 may have TSVs to make through contact from one side of the interposer chip to the other side of the interposer chip 110. However, it will be appreciated that bond pads and/or traces may be provided on only one side of the interposer chip 110 and contact may be made from the interposer chip 110 to the PCB 120 using wire bond techniques. In this case, the interposer chip may extend out beyond the periphery of the VCM 140 to provide sufficient area where bond pads may be formed beyond the periphery of the VCM 140 to enable wire bond contacts to the PCB 120.

Figure 2:
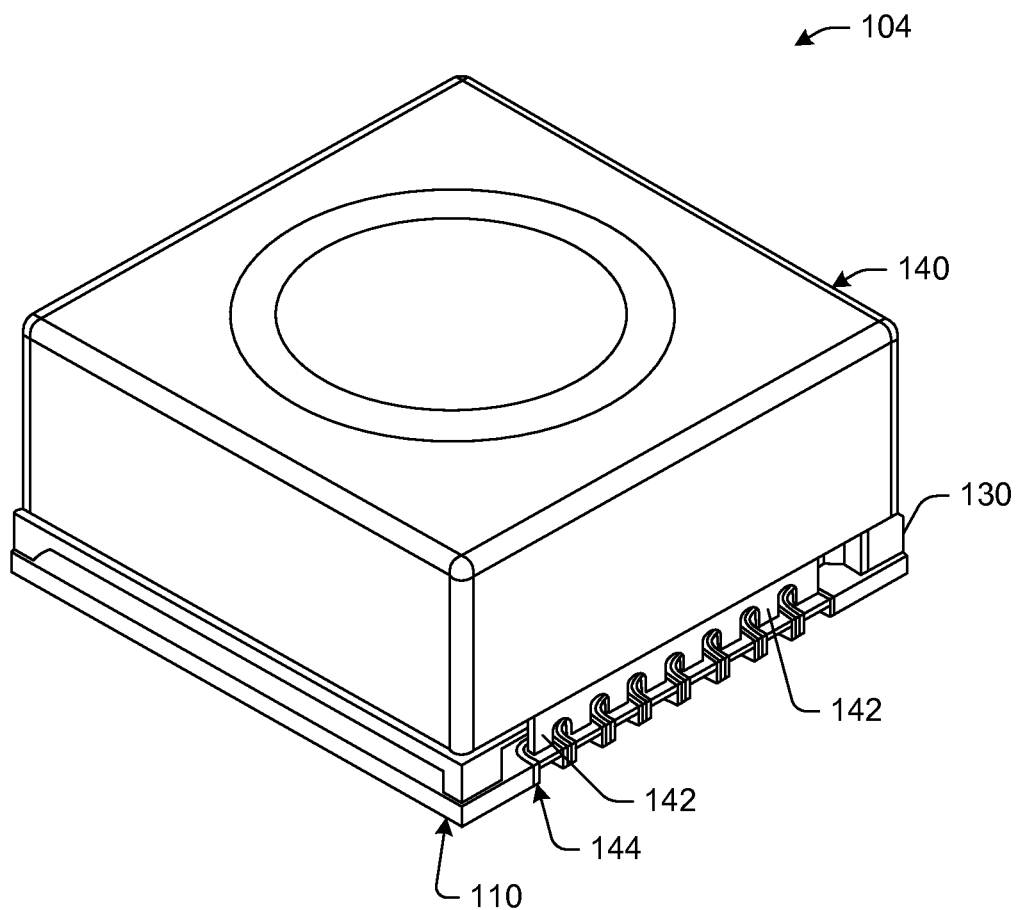
FIG. 2 is a schematic diagram illustrating a perspective view of an example imager assembly that is part of the imager module with a castellated interposer chip of FIG. 1, in accordance with example embodiments of the disclosure.

FIG. 2 is a schematic diagram illustrating a perspective view of an example imager assembly 104 that is part of the imager module 100 with a castellated interposer chip 110 of FIG. 1, in accordance with example embodiments of the disclosure. The perspective view in FIG. 2 (e.g., with the VCM 140 on top) is with the imager assembly 104 flipped relative to the view in FIG. 1 (e.g., with the VCM 140 on bottom). It can be seen that the electrical contacts 142 of the VCM module 140 may be partially surrounded and in electrical contact with the castellated contacts formed on the interposer chip 110. In example embodiments, the electrical contacts 142 of the VCM 140 may be relatively long, such that the VCM 140 may sit atop the lens holder assembly 130. As such, the long contacts of the VCM 140 may be prone to bending or other microscopic or macroscopic defects. By having a castellated contact on the periphery of the interposer chip 110, potential defects or yield loss resulting from non-uniformities in the electrical contacts 142 may be, at least partially, mitigated. In this particular view, partially castellated contacts 142 are shown, where the castellated contacts do not extend the full depth of the interposer chip, but only a portion of the thickness of the interposer chip 110.

It will be appreciated that the interposer chip 110, in example embodiments, to enable the aforementioned configurations, may have a first set of bond pads on the first side (e.g. top side) to make contact with the PCB 120. The interposer chip 110, in example embodiments, may further a second set of bond pads or electrical contacts on a second side (e.g., bottom side) that may be used to make electrical contact with the image sensor 132. In some example embodiments, where the interposer chip 110 may have SMD(s) disposed thereon, the interposer chip 110 may further have a third set of bond pads on the second side (e.g., the bottom side) onto which SMD(s) may be attached. In some example embodiments, where SMD(s) are disposed on the interposer chip 110, a molding may be provided on top of the SMD(s) that are attached to the interposer chip 110. The interposer chip 110, in example embodiments, may still further have the castellated contacts 144 on the periphery of the interposer chip 110 to make contact with the VCM 140 or other electromechanical device. TSVs may be provided within the interposer chip 110, in example embodiments, to route signals from a first side of the interposer chip 110 to a second side of the interposer chip 110. For example, autofocus (AF) control signals to control the VCM 140 may be received from an entity external to the imager module 110 via the PCB 120. These AF control signals may, therefore, in example embodiments, be routed from the PCB 120 via the bond pads 134 by which the PCB 120 electrically contacts the interposer chip 110, one or more levels of interconnects on the interposer chip 110, one or more TSVs, and one or more castellated contacts 144 by which the VCM 140 electrically contacts the interposer chip 110.

Figure 3:
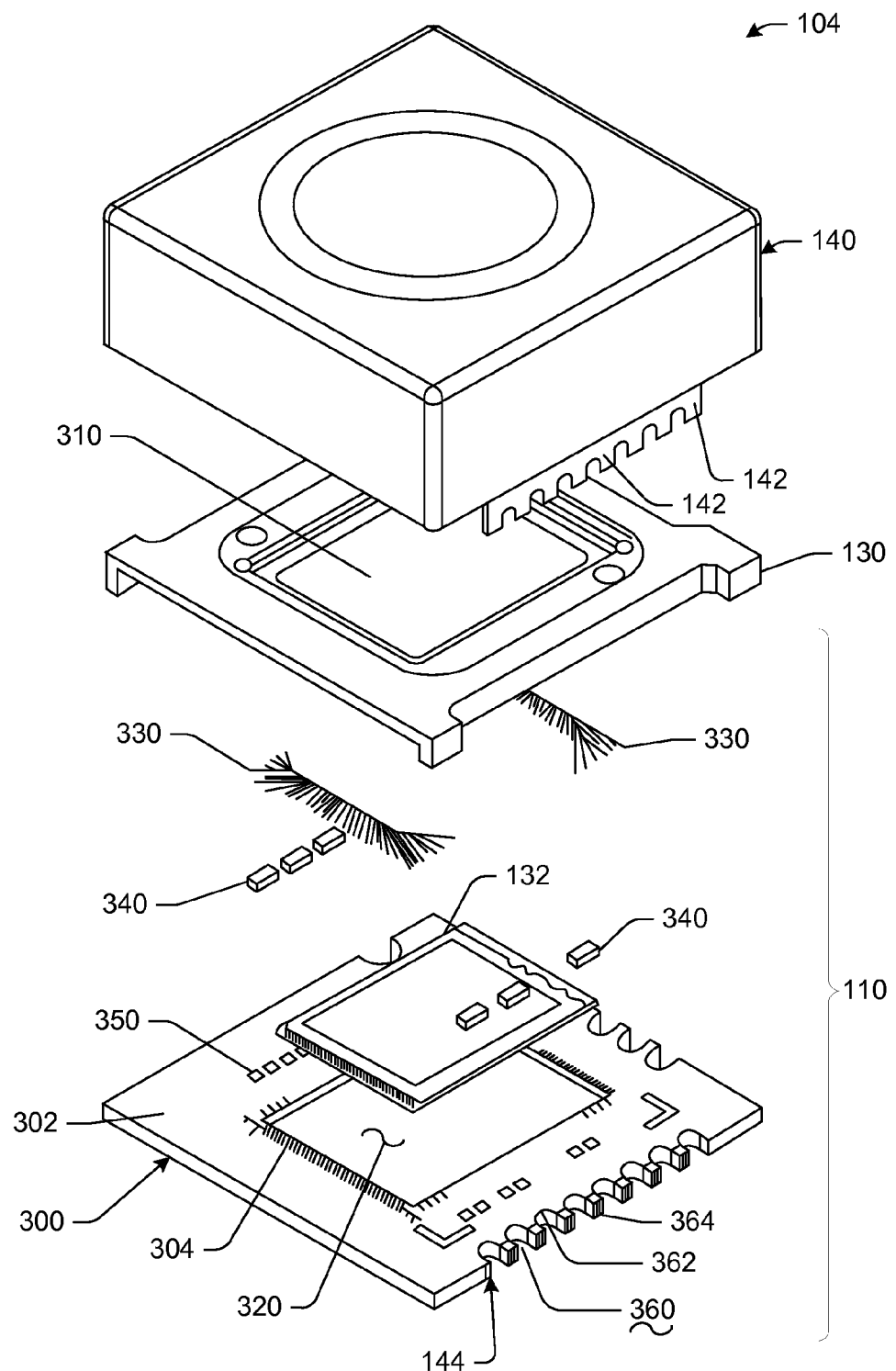
FIG. 3 is a schematic diagram illustrating an exploded perspective view of the example imager assembly with a castellated chip of FIG. 2, in accordance with example embodiments of the disclosure.

FIG. 3 is a schematic diagram illustrating an exploded perspective view of the example imager assembly 104 with a castellated interposer chip 110 of FIG. 2, in accordance with example embodiments of the disclosure. The interposer chip 110 may include an interposer die 300, such as an interposer die 300 fabricated on a Si wafer. Alternatively, the interposer die 300 may be fabricated on any suitable substrate, such as GaAs wafer, InP wafer, glass substrates, polysilicon substrates, quartz substrates, sapphire substrates, or the like. The interposer chip 110 may be fabricated using a variety of semiconductor processes, such as processes for forming TSVs, interconnect layers (e.g., metal routing layers), and/or bond pads. Any suitable process, such as reactive ion etching (RIE), laser ablation, chemical etching, plasma etching, chemical vapor deposition (CVD), physical vapor deposition (VPD), electron beam (ebeam) deposition, electroplating, electroless plating, annealing, ultraviolet (UV)/thermal curing, chemical-mechanical polish (CMP), photoresist spin, photolithography, ashing, combinations thereof, or the like, may be employed in fabricating the interposer die 300.

In example embodiments, the interposer die 300 may have two interconnect layers on each side. Bond pads 304 for making contact to an image sensor 132 may be provided on a second side 302 of the interposer die 300. The bond pads 304 may be on the same side (e.g., the second side 302) and formed in the upper layer of metal interconnect of that side 302. Castellated contacts 144 for making contact to the VCM 140 may be on the edges of the interposer die. The castellated contacts 144 may be formed when the interposer die is singulated on the wafer on which it was fabricated, as described herein. In example embodiments, the interposer die 300 may have only one layer of metal interconnect on each side. In other example embodiments, the interposer die 300 may have more than two layers of metal on each side. In still other example embodiments, the interposer die 300 may have different number of metal interconnect layers on each side. For example, the interposer die 300 may have three layers of metal interconnects on one side and one layer of metal interconnect on the other side. In yet other example embodiments, the interposer die 300 may have one or more layers of metal contacts on one side 302 of the interposer die 300, but not on the other side of the interposer die 300. In embodiments where there are interconnect traces on both sides of the interposer die 300, there may be TSVs to connect interconnect traces on one side of the interposer die 300 to the other side of the interposer die 300.

As shown in this example embodiment, the interposer chip 110 may have one or more SMDs 340 disposed thereon. The SMDs 340 may be any variety of discrete devices, integrated circuits, passive devices, and/or active devices. The SMDs 340 may include, but are not limited to, resistors, inductors, capacitors, diodes, transistors, logic gates, microcontrollers, microprocessors, application specific integrated circuits, digital signal processors, amplifiers, analog circuits, digital circuits, combinations thereof, or the like. The SMDs 340 may be attached to interposer die 300 using any suitable mechanism, including, for example, solder processes on in-line (e.g., dual in-line, quad in-line, etc.) packages, ball grid arrays (BGAs), or the like. The SMDs 340 may be attached to a set of bond pads 350 on the second side 302 of the interposer die 300.

In example embodiments, where SMDs 340 may be disposed on the interposer chip 110, a molding may be disposed on top of the SMDs 340. The molding may provide a substantially planer surface on top of the SMDs 340 attached on the second side of the interposer chip 110. The molding may be made of thermosetting polymer materials, in example embodiments. In example embodiments, a transfer molding process may be performed, where thermosetting polymer materials may be deposited on the surface (e.g., the surface of the interposer die and SMDs 340). In example embodiments, the molding may be templated so as to leave castellated contacts 144 on the periphery of the interposer die 300 to make reliable electrical contact with the VCM 140.

In example embodiments, SMT process to attach the SMDs 340 on the interposer die 300 may be performed by pick-and-place techniques at a wafer level. In other words, the interposer die 300 may still be in wafer form (e.g., prior to singulating/sawing the interposer die 300). Alignment marks may be patterned on the surface of the interposer die 300 to enable gross and/or fine alignment by the pick-and-place machines to attach the SMDs 340 to the interposer die 300. Furthermore, the molding process (e.g., template, thermosetting material deposition, cure, etc.), to fabricate the molding, if applicable, may be performed at the wafer level prior to die singulation.

Once the SMDs 340 are attached to the interposer die 300 and the optional molding is formed thereon, the image sensor 132 may be attached on the interposer die 300. The image sensor 132 may be attached to the interposer die 300 using epoxy. The image sensor 132 may be attached on the flat surface 302 of the interposer die 300, in some example embodiments. In other example embodiments, the image sensor may be attached to a cavity 320 or inset formed on the surface 302 of the interposer die 300. In example embodiments, the image sensor 132 may be attached on-to the interposer die 300 after singulation of the interposer die 300, either on saw tape or on any other suitable die carrier. In other example embodiments, the image sensor 132 may be attached on-to the interposer die 300 at a wafer level, prior to singulation of the interposer die 300.

The interposer die 300 may have the partial hole or cavity therein, such as at the center of the interposer die 300 so that the image sensor may be partially inset in the interposer die 300. This may allow for the imager assembly 104 to have a reduced height compared to an embodiment where the image sensor was disposed flush with the surface 302, rather than as an inset. The cavity in the interposer die may be fabricated by chemical etching processes (e.g., potassium hydroxide (KOH) etching, tetramethylammonium hydroxide (TMAH) etching, etc.) or plasma assisted etching processes (e.g., reactive ion etching (RIE), high-density plasma (HDP) etching, Bosch etching, etc.). The image sensor 132 may be attached to the interposer die in a manner where electrical contacts, such as wire bonds 330, may make relatively reliable contact with bond pads 304 on the interposer die 300 and with corresponding bond pads of the image sensor 132. The image sensor 132 may further be positioned in a manner such that light from a scene to be imaged passes through the lens holder assembly 130 and a lens 310 therein and is impingent on photosensitive pixels of the image sensor 132.

The image sensor 132 may be of any suitable type, such as active-pixel, charge coupled device (CCD), complementary metal-oxide-semiconductor (CMOS), or the like. The image sensor 132 may be electrically and mechanically attached to the interposer die 300 by any suitable mechanism, such as wire bond 330. The image sensor 132 may be of any suitable pixel count and/or aspect ratio. For example, the image sensor 132 may have an aspect ratio of 4:3 and have 13 million pixels (Megapixels). When an image is captured by the image sensor 132, an image signal corresponding to the captured image may be generated. This image signal or image data may represent the intensity and/or color of each of the pixels of the captured image. Each of the pixels of the captured image may correspond to photosensitive pixels of the image sensor 132.

Figure 4:
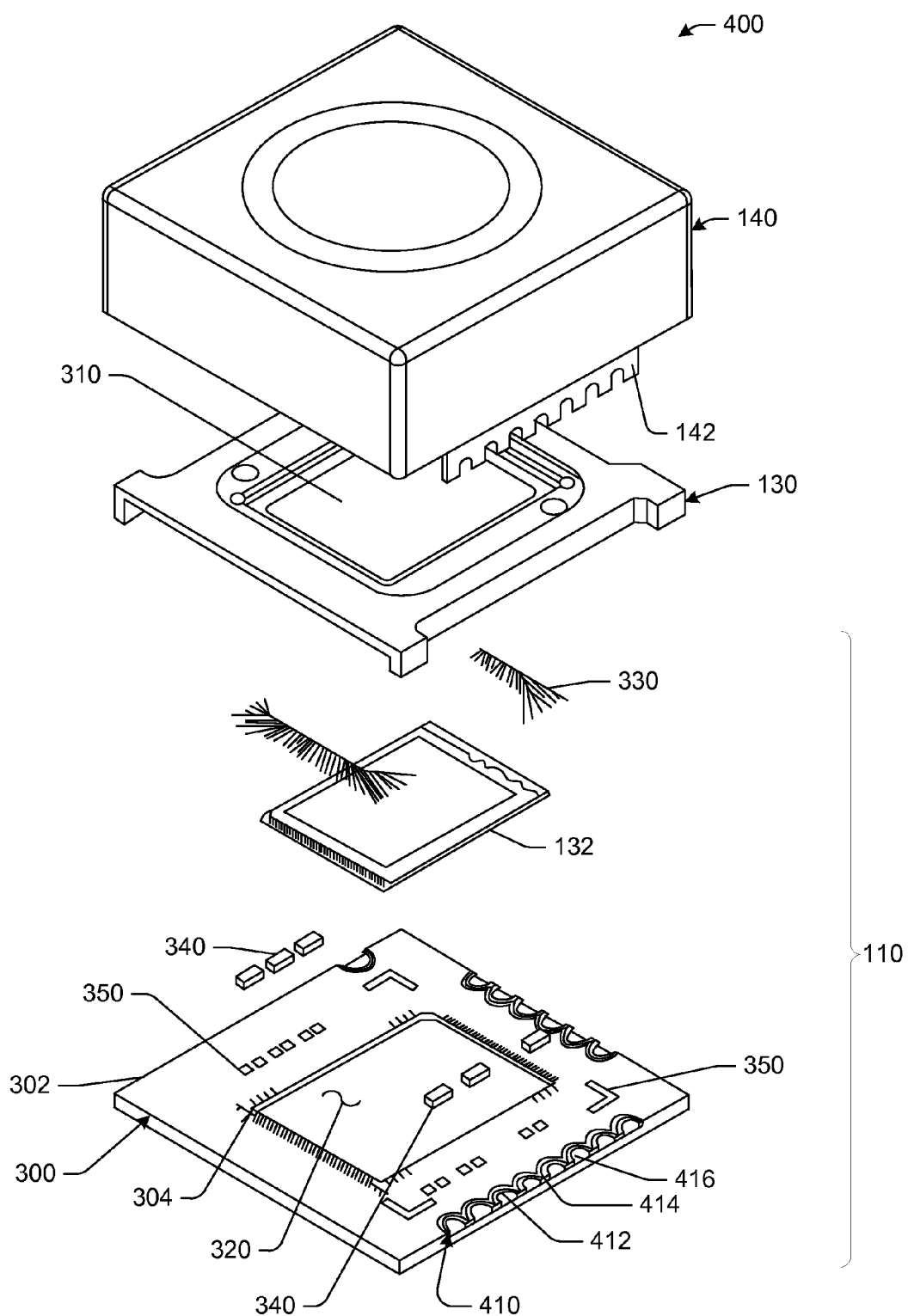
FIG. 4 is a schematic diagram illustrating an exploded perspective view of another example imager assembly with a partially castellated interposer chip, in accordance with example embodiments of the disclosure.

FIG. 4 is a schematic diagram illustrating an exploded perspective view of another example imager assembly 400 with a partially castellated interposer chip 110, in accordance with example embodiments of the disclosure. In these embodiments, instead of the castellated contacts 144 that extend from one surface to the other surface of the interposer chip 110, the partially castellated contact 410 may extend from the top surface only partially (e.g., half-way), but not completely to the other surface of the interposer chip 110. The partially castellated contact may have a metal 412 plated sidewall, an end portion 414, and a bottom portion 416 of bulk Si material. This type of partially castellated contact 410 may afford the benefits realized from fully castellated contacts with regards to process and/or manufacture robustness and yield improvements, but may be easier, faster, and/or more inexpensive to fabricate.

Figure 5:
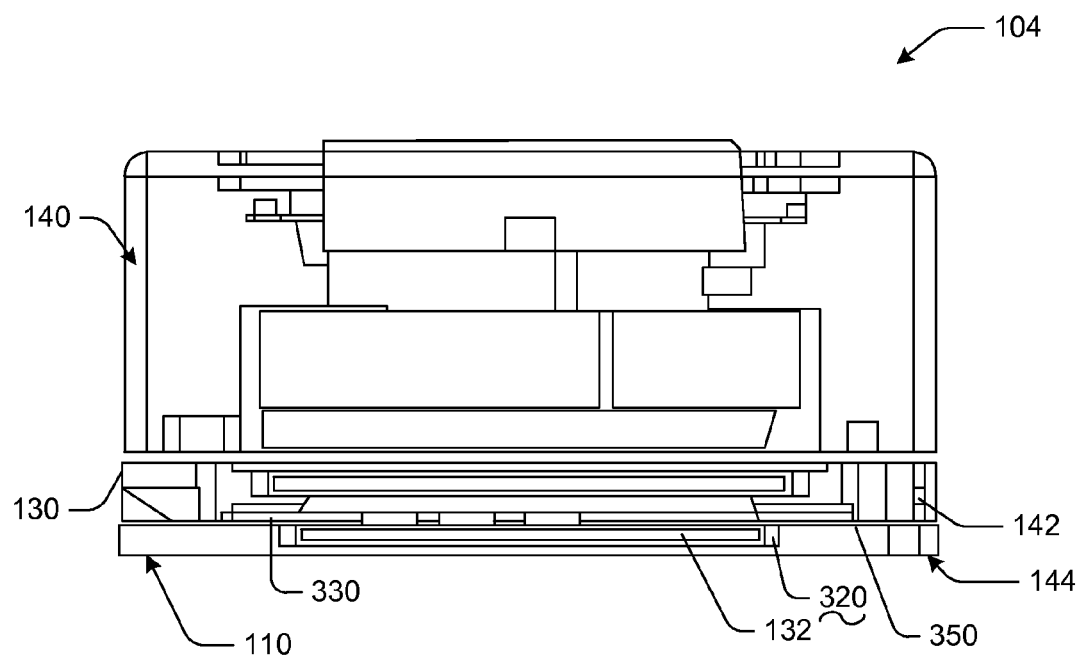
FIG. 5 is a schematic diagram illustrating a sectional view of the example imager assembly of FIG. 2, in accordance with example embodiments of the disclosure.

FIG. 5 is a schematic diagram illustrating a sectional view of the example imager assembly 104 of FIG. 2, in accordance with example embodiments of the disclosure. As depicted, when the image sensor 132 is fully or partially inset in the cavity 320 of the interposer chip 110, the total height of the image sensor may be reduced relative to if the image sensor 132 had not been inset. In a non-limiting example, the total height of the imager assembly 104 may be between about 4 millimeters (mm) and about 7 mm. In another non-limiting example, the total height of the imager assembly 104 may be between about 5 mm and about 6 mm. It should be appreciated that the height of the imager assembly may be any suitable height and is not limited by the examples discussed herein.

It will be appreciated that the imager module 100 with the interposer chip 110 may allow for smaller size and/or finer pitch connection between image sensor 132 and the interposer chip 110. This may be enabled because the interposer chip 110 allows for a relatively more rigid bonding substrate than flexible circuit board materials, such as FR-4. The interposer chip 300 may result in reduced warpage relative to flexible circuit board materials, thereby enabling smaller size wire bond and/or flip-chip connections between the image sensor 132 and the interposer chip 110 or any other components to be attached to the interposer chip 110. Furthermore, the image sensor 132 fabricated on Si, may be the same substrate material as the interposer chip 110. As a result, the coefficient of thermal expansion (CTE) is substantially matched between the image sensor 132 and the interposer chip 110. This may lead to relatively high levels of reliability of the interposer chip 110 to image sensor 132 mechanical and electrical connections under use and/or test conditions, such as thermal cycling, autoclave, or the like.

Due to CTE match, low warpage, and highly reliable connections between the image sensor 132 and the interposer chip 110, relatively smaller connections may be made between the image sensor 132 and the interposer chip 110. For example, the bond pads on the interposer chip 110 that interface with the image sensor 132 may be about 75 to about 200 micrometers (μm) or less in width or diameter. In some cases, the bond pads on the interposer to interface with the image sensor 132 may be about 50 μm, or less, in width or diameter. The bond pads on the image sensor 132 side may also be of smaller and/or finer pitch than if the image sensor 132 was to be attached to a PCB. Therefore, fewer metal interconnect levels of fan out may be needed on the image sensor 132 to interface with the interposer chip 110, resulting in processing cost savings. For example, an image sensor that is to be wire-bonded onto a PCB may have bond pads that are about 250 μm or greater in width and may have four layers of metal interconnects to fan out to that size and pitch of bond pads. On the other hand, in this example, if a similar image sensor is attached to a Si interposer with 100 μm bond pads, only two layers of metal interconnect may be needed to fan out the image sensor signals to 100 μm bond pads.

The PCB 120 may be attached to the interposer chip 110 via bond pads 134. These bond pads 134 may be greater in area than the bond pads used to attach the image sensor 132 to the interposer chip 110. For example, the interposer chip may have 70-100 μm width bond pads. In other words, the interposer chip 110 may have a first set of bond pads on the first side for attaching the image sensor 132 and a second set of bond pads for attaching the PCB 120 and each of the first set of bond pads may have a smaller area than each of the second set of bond pads.

It will further be appreciated that the imager module 100 using the interposer chip 110 may have a smaller form factor, such as a thinner profile, than an imager module that integrates all of the components (e.g., image sensor, VCM, lens assembly, SMDs) onto a PCB. The relatively compact form factor may enable the integration of the imager module 100 into personal user devices (e.g., mobile phones, wearable devices, etc.) where space may be limited.

Figure 6:
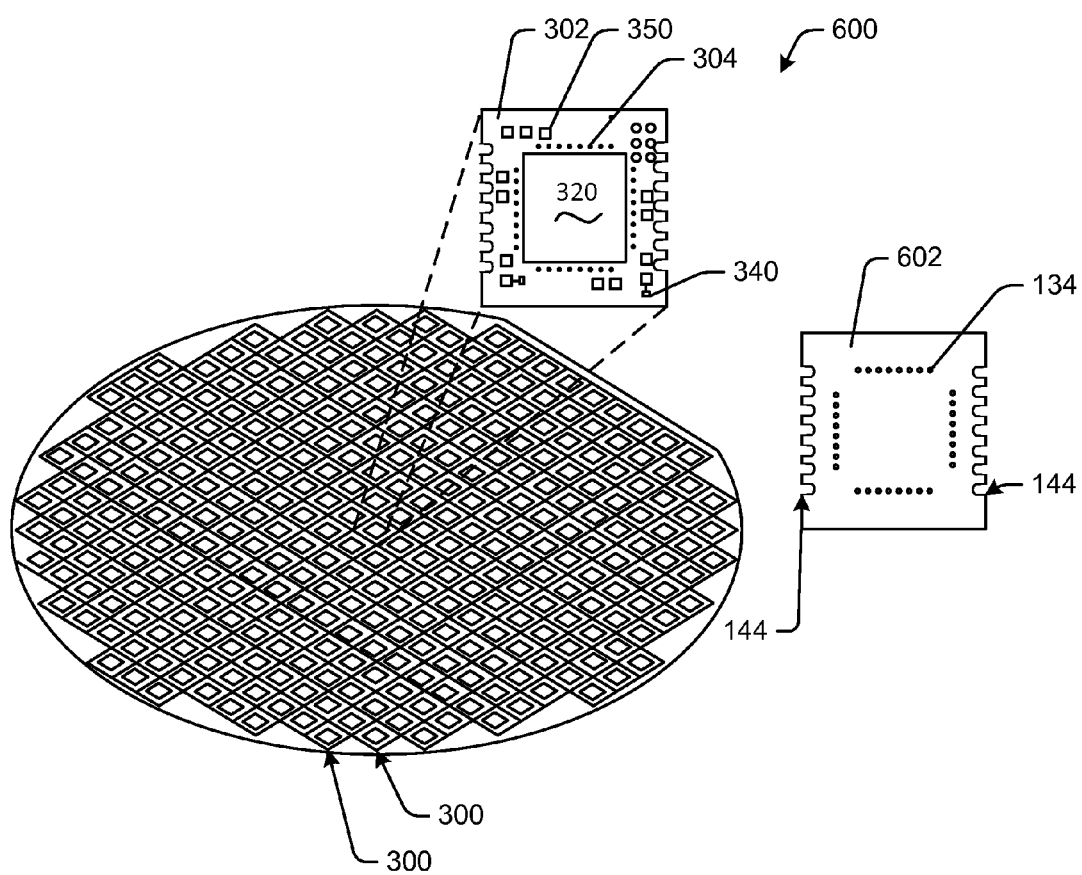
FIG. 6 is a schematic diagram of an interposer die with castellation and bond pads used for fabricating the interposer chip depicted in FIG. 2, in accordance with example embodiments of the disclosure.

FIG. 6 is a schematic diagram of an interposer die 300 with castellation 144 and bond pads 134, 304, 350 used for fabricating the interposer chip 110 depicted in FIG. 2, in accordance with example embodiments of the disclosure. As depicted here, the interposer die 300 may be fabricated on a wafer 600. The wafer may have a plurality of interposer die 300 fabricated thereon. The number of interposer die 300 that are fabricated on a wafer may depend on the area of the interposer die 300 and the size of the wafer 600. The wafer 600 may be of any suitable size or orientation. For example, the wafer 600 may have a diameter of 100 millimeters (mm), 150 mm, 200 mm, or 250 mm, with or without flats and/or notches. Furthermore, the wafer 600 may be [100] oriented crystalline Si, [110] oriented Si, [111] oriented Si, or polysilicon. Alternatively, the wafer 600 may be non-Si material, such as glass, sapphire, quartz, or other suitable substrate materials. The wafer 600, and therefore the interposer die 300, may be of any suitable thickness, such as a thickness in the range of about 30 μm (0.03 mm) to about 200 μm (0.3 mm). In one example embodiment, the wafer 600, and therefore the interposer die 300, may have a thickness of about 200 μm. In another example embodiment, the wafer 600, and therefore the interposer die 300, may have a thickness of about 50 μm. In yet another example embodiment, the wafer 600, and therefore the interposer die 300, may have a thickness of about 350 μm.

In some example embodiments, some of the processes to fabricate the wafer 600 may be performed at a thickness that is greater than the final thickness of the wafer 600 and interposer die 300 fabricated thereon. For example, a 200 mm wafer may have a starting thickness of approximately 750 μm (0.75 mm). This wafer 600 may be processed on one side, to form interconnect layers thereon. The wafer 600 may then be thinned, such as by backside grinding and/or polishing, to approximately the final thickness of the interposer die 300 to process the other side of the wafer 600. In example embodiments, some, but not all, of the processes associated with forming TSVs may be performed after thinning the wafer 600. In other example embodiments, all of the processes of forming the TSVs may be performed after thinning the wafer 600.

The interposer die 300 may have a first side 302 (e.g., top side) and a second side 602 (e.g., bottom side). The first side 302 may have the first set of bond pads 304 that may be utilized for attaching the image sensor 132 onto the interposer die 300. Although these first set of bond pads 304 are depicted as circular in shape, they need not be such, and may indeed be any suitable shape, including square or rectangular. The first set of bond pads 304 may be formed in a last layer (e.g., top layer on the first side 302) of metal interconnect fabricated on the interposer die 300. The first side 302 may further include a second set of bond pads 350 that may be utilized for attaching SMDs 340 to the interposer die 300. Although these second set of bond pads 350 are depicted as square in shape, they need not be such, and may indeed be any suitable shape, including circular or rectangular. The second set of bond pads 350 may be formed in a last layer (e.g., top layer on the first side 302) of metal interconnect fabricated on the interposer die 300. In example embodiments, the first set of bond pads 304 and the second set of bond pads 350 may be formed contemporaneously (e.g., by the same fabrication processes).

The number of the first set of bond pads 304 may depend, at least in part, on the number of electrical and/or mechanical contact points to be formed between the image sensor 132 and the interposer die 300. In some example embodiments, there may be dummy bond pads included in the first set of bond pads 304 for any variety of reasons, such as improved areal uniformity and/or improved process uniformity. The number of the second set of bond pads 350 may depend, at least in part, on the number of electrical and/or mechanical contact points to be formed between the SMDs 340 and the interposer die 300. In some example embodiments, there may be dummy bond pads included in the second set of bond pads 350 for any variety of reasons, such as improved areal uniformity and/or improved process uniformity. In example embodiments, the size of the bond pads 304 may be smaller than the size of the bond pads 350. In other words, the width and/or the diameter of the bond pads 304 for attaching the image sensor 132 (e.g. a Si substrate element) to the interposer die 300 may be smaller than the bond pads 350 for attaching the SMDs 340 (e.g., a non-Si substrate) to the interposer die 300.

In example embodiments, the first set of bond pads 304 may be used to route image sensor signals, such as when an image is captured by the image sensor 132. The image sensor signals may be routed, in example embodiments, from the image sensor 132 to the interposer chip 110 via the first set of bond pads 304 and then to the PCB 120 via the bond pads 350 on the second side 602 of the interposer die 300, and then to one or more entities external to the imager module 100 via contacts 122.

The second side 602 of the interposer die 300 may include a third set of bond pads 134 for making contact to the PCB 120. The PCB 120 may be aligned and bonded to some or all of the third set of bond pads 134 for making electrical and mechanical contact to the interposer die 300. Although this third set of bond pads 134 are depicted as circular in shape, they need not be such, and may indeed be any suitable shape, including square or rectangular. The third set of bond pads 134 may be formed in a last layer (e.g., top layer on the second side 602) of metal interconnect fabricated on the interposer die 300.

The second side 602, in some example embodiments, may further include one or more castellated metal contacts 144 on the periphery of the interposer die 300. In some example embodiments, the castellated metal contacts 144 may be fully castellated 144 (e.g., extending from one side 302, 602 to the other side 602, 302. In other cases, the castellated metal contacts 410 may be partially castellated 410 (e.g., extending part way from the first side 302 to the second side 602 of the interposer die 300. The castellated contacts 144, 410 may include a metallic surface in a partial cylinder shape that enables reliable assembly of the VCM 140 or other electromechanical device onto the interposer die 300. The castellated shape of the castellated contacts 144, 410 may be particularly robust to accommodating non-uniformities in the electrical contacts 142 of the VCM 140 or other electromechanical device. In some cases, when the VCM 140 is disposed on the interposer die 300 with the VCM contacts 142 in contact with respective corresponding castellated contacts 144, 410, the VCM contacts 142 may be partially spring biased toward the respective corresponding castellated contacts 144, 410. In other words, the VCM contacts, in example embodiments, may exert a compressive force inward on its corresponding castellated contacts 144, 410. This may enhance the reliability of the contact between the VCM contact 142 and the castellated contacts 144, 410, that may not be possible with standard bond pad type contacts.

In example embodiments, VCM control signals or electromechanical device control signals, for controlling the movement of the lens assembly 130 may be received via the PCB 120 and the third set of bond pads 134. These VCM control signals may be routed either directly or indirectly to one or more of the castellated contacts 144, 410 to provide the VCM control signals to the VCM 140 or other electromechanical device. In some example embodiments, metallic traces disposed on the second side 602 of the interposer chip 110 may be used to route the VCM control signals from the third set of bond pads 134 to the castellated contacts 144, 410. In other example embodiments, the VCM control signals may be routed to the first side 302 of the interposer die 300, such as to one or more SMDs 340 disposed on the first side 302 prior to routing to the castellated contacts 144, 410. In example embodiments, there may be metallic traces from one or more of the bond pads, 304, 350 and/or SMDs 340 on the first side 302 to one or more of the castellated contacts 144, 410.

The interposer die 300 may still further include one or more embedded passive devices (not shown), such as a resistor, capacitor, or inductor. The embedded passive device may be formed in/on the Si of the interposer die 300. The embedded passive device may be, for example, a resistor formed by a serpentine (e.g., long and narrow) metal line formed in the metal interconnect layer on either the first side 302 or the second side 602. As another example, the embedded passive device may be an inductor formed as a nested serpentine metal line formed in the metal interconnect layer on either the first side 302 or the second side 602. As still another example, the embedded passive device may be a capacitor formed as two metal plates on two different metal interconnect layers on either the first side 302 or the second side 602. In other example embodiments, the embedded passive device(s) may be formed in the silicon substrate level, rather than, or in addition to, metal interconnect levels. In these embodiments, doped elements on the silicon substrate of the interposer die 300 may be made and contacted using, for example, refractory metal plugs.

The interposer die 300 may further have a one or more TSVs (not shown) therein, extending substantially from the first side 302 to the second side 602 for conducting electrical signals (e.g., current, voltage, etc.) between interconnects formed on the first side 302 and interconnects formed on the second side 602. The TSVs may not, in actuality, be visible by viewing the first side 302 or the second side 602 of the interposer die 300. Instead, the TSVs- may, in example embodiments, be seen in cross-sectional view.

In example embodiments, the TSVs may be configured to route one or more signals between the first side 302 and the second side 602 of the interposer die 300. For example, VCM control signals to control the VCM 140 to move the lens assembly 130 for the purposes of autofocusing the imager module 100 may be received from an entity external to the imager module 100 and routed via the PCB 120, the third set of bond pads 134, one or more interconnect metal levels, one or more TSVs, and the castellated contacts 144, 410 to the VCM 140.

The TSVs, in example embodiments, may be formed as a TSV-first integration (e.g., TSVs are formed before other interconnect layers on the interposer die 300), a TSV-last integration (e.g., the TSVs are formed after all but the last interconnect metal layer is formed on the interposer die 300), or a TSV-in-the-middle integration (e.g., the TSVs are formed after one or more interconnect layers are formed, but not before all but the last interconnect layer is formed). For the purposes of this discussion, all of the conducting interconnect layers (e.g., including the layers in which the bond pads on both sides 302, 602 are formed) are considered interconnect metal layers. Interconnect metal layers may be connected to the immediately adjacent layer (e.g., immediately above or below) on the same side 302, 602 by one or more inter-layer vias. Layers of interconnect metal layers in opposite sides 302, 602 of the interposer die 300 may be connected to each other via one or more TSVs. As discussed above, the TSVs may extend the thickness of the interposer die 300 and the wafer 600 on which the interposer die 300 was created. The TSVs may be any suitable length corresponding to the thickness of the interposer die 300. In example embodiments, the TSVs may be 200 µm long. In other example embodiments, the TSVs may be 50 µm long.

Interconnect metal layers may be formed on the first side 302 and/or the second side 602 of the interposer die 300 using any suitable mechanism. In some cases, both sides 302, 602 may have the same number of metal interconnect layers (e.g., three metal interconnect layers on each side 302, 602). In other example embodiments, there may be a different number of metal interconnect layers on the first side 302 compared to the second side 602. The metal interconnect layers may be formed by subtractive processes or by inlaid processes. For example in a subtractive process, a dielectric material (e.g., silicon dioxide ($SiO_2$)) may be grown or deposited, followed by deposition of a stack of refractory metal or alloys thereof (e.g., Ti, TiN, Ta, TaN, W, etc.) and Al. Then the aluminum may be patterned by spinning photoresist and photolithography. Next the metal stack may be etched by plasma etching. As such, a patterned metal interconnect layer may be formed by a subtractive integration. In an example inlaid or damascene process, dielectric material, such as $SiO_2$ or SiCOH, may be deposited, such as by plasma enhanced chemical vapor deposition (PECVD), patterned, such as using photo lithography, and etched, such as by RIE using fluorinated chemistries. Next, a seed metal layer may be deposited, such as by sputtering, and then a metal deposition may be performed, such as by electroplating Cu. After electroplating Cu, a chemical-mechanical polish (CMP) may be performed to polish Cu back to the trenches formed by the dielectric etch. As such, a patterned metal interconnect layer may be formed by a damascene or dual-damascene process.

The interposer die 300 may further have a cavity 320 defined therein. This cavity 320, when the imager module 100 is fully assembled, may enable a reduced height profile of the fully assembled imager module 100. In example embodiments, the first set of bond pads 304 may be disposed on the interposer die 300 in proximity of the periphery defining the cavity 320. As such, the image sensor 132 when attached (e.g., wire bonded) onto the interposer die 300 may inset in the cavity 320 with electrical contacts via the first set of bond pads 304 around the cavity 320 and with the photosensitive pixels of the image sensor 132 exposed, such as by light from the lens assembly 130. The configuration of the image sensor 132 to the interposer die 300 in the cavity 320 may provide for a relatively thin profile (e.g., compact form factor) that may be suitable for integration in personal mobile devices such as smartphones and tablet computers.

The cavity 320 may be formed by any suitable mechanism and at any point in the fabrication of the interposer die 300, such as prior to forming interconnect layers on the interconnect die, or alternatively, after forming the interconnect layers on the interposer die 300. The cavity in the interposer die 320 may be fabricated by any suitable mechanism, such as by chemical etching using chemistries such as KOH or TMAH. In example embodiments, the cavity 320 may be defined by a sidewall along the thickness of the interposer die 300. In some example cases, this sidewall may have a slope that is not substantially 90°. For example, in some cases, TMAH or KOH etch of [100] silicon may result in sidewalls that are approximately 45°. In other example embodiments, the cavity 320 may be formed by plasma etching, such as deep silicon etching, RIE, Bosch etch, or the like.

Figure 7:
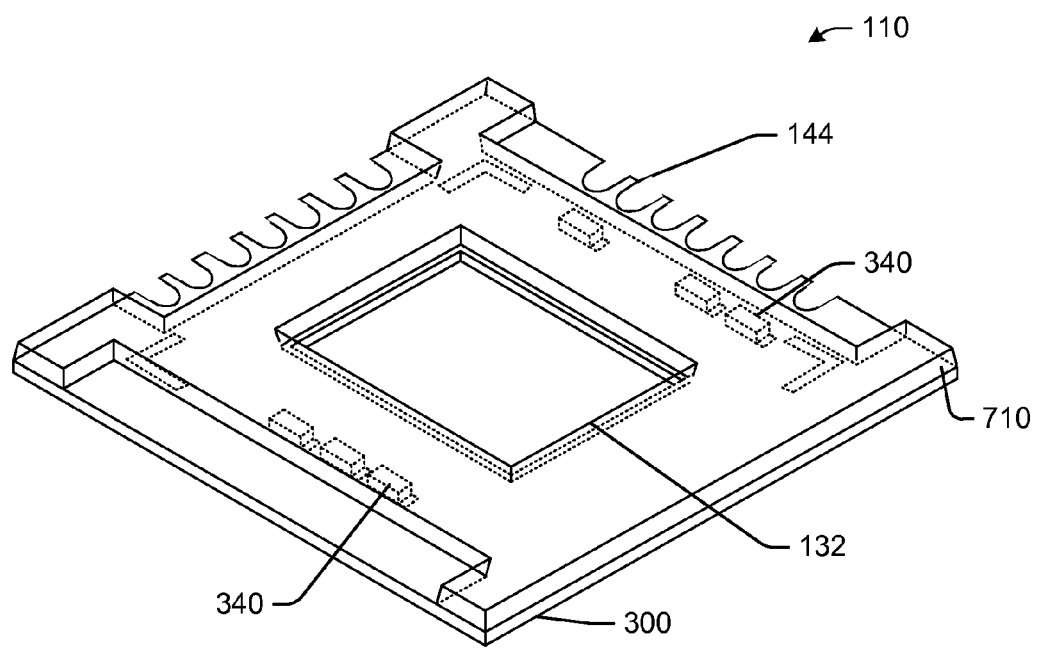
FIG. 7 is a schematic diagram illustrating a perspective view of the interposer chip with castellation, in accordance with example embodiments of the disclosure.

FIG. 7 is a schematic diagram illustrating a perspective view of the interposer chip 110 with castellation 144, 410, in accordance with example embodiments of the disclosure. As shown here, in some example embodiments, if SMDs 340 are attached to the interposer die 300, such as on one or more bond pads 350, then molding 710 may be used to protect the SMDs 340 on the first surface 302 of the interposer die 300. The molding material may be a thermosetting polymer material, in example embodiments. In example embodiments, the molding material may be deposited with a blocking template (e.g., by blocking regions, such as bond pads, where the molding is not desired). After depositing the molding material (e.g., thermosetting polymer material) the molding material may be cured to form the molding 710. This cure may be a UV cure and/or thermal cure. After the cure the thermoset polymer material may harden (e.g., crosslink) to form the molding 710. The molding 710 may provide a substantially planer surface on top of the SMDs 340 attached on the first side 302 of the interposer chip 110. In some example embodiments, the molding 710 may not be provided, particularly if the molding interferes with the wire bonding and/or optical functionality of the image sensor 132.

Figure 8:
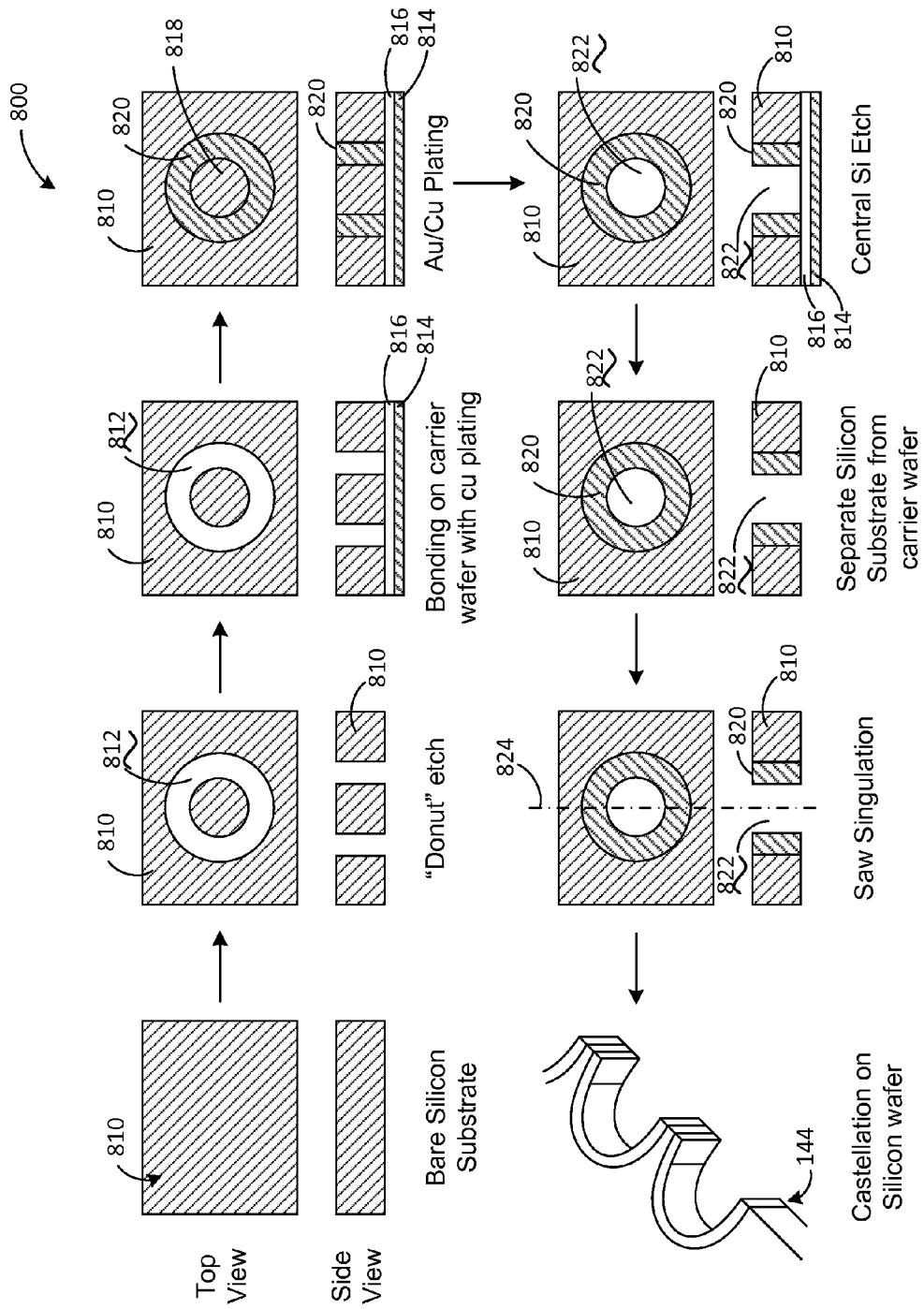
FIG. 8 is a flow diagram of an example method for fabricating castellated edges of the interposer chip, in accordance with example embodiments of the disclosure.

FIG. 8 is a flow diagram of an example method 800 for fabricating castellated edges 144 of the interposer chip 110, in accordance with example embodiments of the disclosure. Bare Si substrate 810 may initially be provided. In example embodiments, the Si substrate may have other patterns and/or interconnects formed thereon. Therefore, in these embodiments, the formation of the castellated contacts 144, 410 may be similar to a TSV last-type of integration sequence. Alternatively, when starting with bare, unpatterned Si, the formation of the castellated contacts 144, 410 may be similar to a TSV first-type integration. The bare Si substrate 810 may be any suitable substrate, such as the wafer 600. The substrate 810 may be [100] oriented crystalline Si, [110] oriented Si, [111] oriented Si, or polysilicon. Alternatively, the substrate 810 may be non-Si material, such as glass, sapphire, quartz, or other suitable substrate materials. The substrate 810 may be of any suitable thickness, such as a thickness in the range of about 30 µm (0.03 mm) to about 400 µm (0.4 mm). In example embodiments, the substrate 810 may be thinned prior to commencing the processes of method 800.

A "donut" or annular etch may be performed through the thickness (or partially though the thickness in the case of partially castellated contacts 410) of the substrate 810. The annular hole 812, in example embodiments, may be formed by any suitable plasma etching (e.g., REI, magnetically enhanced reactive ion etching (MERIE), high density plasma (HDP) etching, etch-passivation-etch, Bosch etch, inductively coupled plasma (ICP) etching, etc.) using either a photoresist mask or a hard mask (e.g., $SiO_2$, $Si_3N_4$, etc.) and using any suitable process gas (e.g., $SF_6$, $CF_4$, $C_2F_6$, $C_3F_8$, $C_4F_8$, $NF_3$, $O_2$, $CO_2$, etc.). In other example embodiments, the annular TSV hole 812 may be formed by laser ablation process. In some example embodiments, the annular TSV hole 812 and may by passivated, or in other words, a dielectric liner may be provided on the inside walls of the annular TSV hole 812. This dielectric liner may serve to electrically insulate, or at least partially decouple an electrical signal conducted by the annular TSV from the surrounding conductive and/or semiconducting substrate 810 of the interposer die 300. The dielectric liner, in example embodiments, may be deposited, such as by a tetraethylorthosilicate (TEOS) PECVD deposited $SiO_2$. Alternatively, other materials may be deposited on the inner walls of the annular TSV hole 812 or a $SiO_2$ film may be formed, such as by thermal oxidation of the Si substrate of the interposer die 300. Once a dielectric liner is provided on the inside of the annular TSV hole 812, the annular TSV hole 812 may be filled with conductive material, such as electroless or electroplated Cu.

The annular hole 812 etched substrate 810 may be bonded onto a carrier wafer 814 with Cu plating 816. The carrier wafer may provide rigidity to the substrate 810 for subsequent processing. The Cu plating 816 may serve as a seed layer for the growth of metal 818 (e.g., Au/Cu) within the annular hole 812. The growth of the metal 820 may be, in example embodiments, an electroless plating process, such as a Cu electroless plating process. In some example embodiments, prior to filling 820 with Cu the annular hole 812, a diffusion barrier or diffusion inhibitor layer may be deposited. In example embodiments, this diffusion inhibitor layer may be a dielectric layer (e.g., $Si_3N_4$, SiCN, SiC, SiON, etc.) or a metallic diffusion inhibitor (e.g., Ti, TiN, Ta, TaN, W). After plating 820 the annular via 812 using the seed layer 816 of the carrier wafer 814, the central plug 818 of the substrate material 810 (e.g., the donut hole) may be removed 822. The central substrate plug 818 may be removed using any variety of dry (RIE, Bosch, etch-depetch, HDP, etc.) or wet etch (KOH, TMAH, etc.), such as in a template fashion (e.g., photolithography defined etch).

Next, the carrier wafer 814 may be separated from the substrate 810 with the filled annular TSV 820 with a center void 822. As a next process, the substrate may be singulated 824 in a fashion where the substrate 810 may be cut 824 through the annular via 820 and center void 822. In example embodiments, the annular via may be cut 824 substantially through the middle of the annular via 820. In other example embodiments, the cut 824 may be off-center to produce either an elongated or short castellated contact 144, as may be desired. It will be appreciated that to singulate interposer die 300 with annular TSVs 820 for castellation contacts 144 fabricated on a wafer 600, each of the streets between die may have to be cut more than once (e.g., twice). The singulation process 824 may be conducted using any suitable mechanism, such as sawing or laser cutting. In example embodiments, sawing may be performed at a relatively lower speed to prevent excessive chipping at the edges of the interposer die 300, as excessive chipping may lead to poor yield and particularly failure of the castellated contacts 144, 410.

Figure 9:
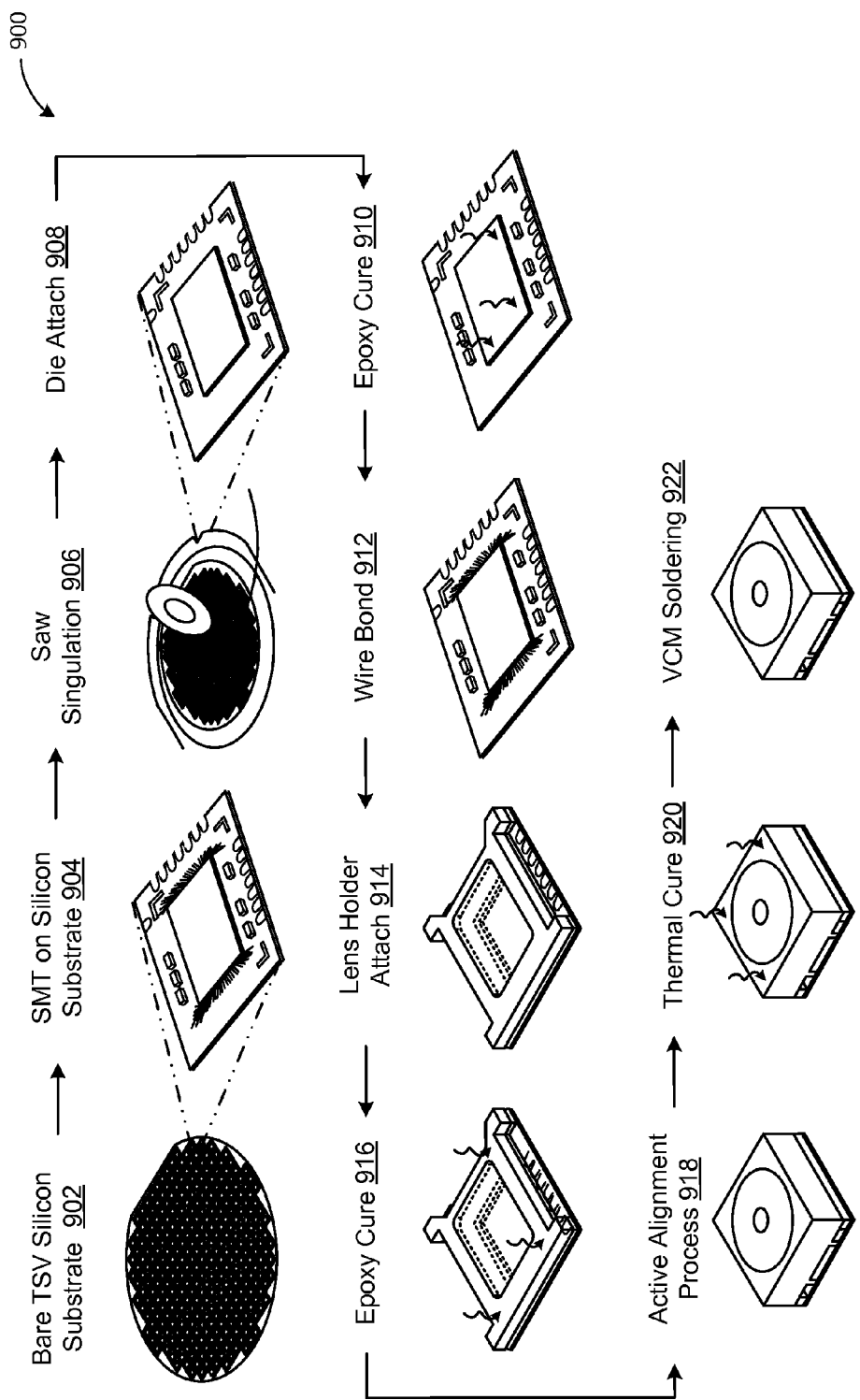
FIG. 9 is a flow diagram of an example method for fabricating the imager assembly of FIG. 2 using the interposer chip with castellation of FIG. 7, in accordance with example embodiments of the disclosure.

FIG. 9 is a flow diagram of an example method 900 for fabricating the imager assembly of FIG. 2 using the interposer chip with castellation of FIG. 7, in accordance with example embodiments of the disclosure. At 902, the interposer die may be fabricated and inspected. In some example embodiments, the interposer die 300 may be fabricated at a semiconductor fabrication facility (fab) using semiconductor processes and related cleanliness levels. The inspection of the wafer 600 having the interposer die 300 and subsequent processes of method 900 may be performed, in example embodiments, outside of a semiconductor fab. In example embodiments, the method 900 may be performed in a back-end assembly and/or packing facility. The fabrication of the interposer die 300 may be performed with the processes described above in conjunction with FIG. 8. The interposer die 300 at this point may not yet be singulated, meaning that the interposer die 300 may still be part of the Si wafer 600 on which it was fabricated with other interposer die 300.

The fabricated wafer 600 with the interposer die 300 thereon may be inspected by any suitable mechanism. In example embodiments, automated defectivity scanning tools may be used to inspect the wafer 600. These inspection tools may use electron beam (ebeam) inspection, optical inspection, dark-field inspection, and/or combinations thereof. Alternatively or additionally, in example embodiments, electrical tests (e.g., automated electrical probe) may be performed, such as on test devices fabricated on the interposer die 300 for the purposes of inspection/test. Further still, in example embodiments, visual inspection may be performed, alternatively or additionally, to identify defective interposer die 300 on the wafer. When or if defective interposer dies (e.g., known defective or suspected defective), the defective interposer die 300, or conversely, known-good-die (KGD) may be identified, such as on a wafer map corresponding to the wafer 600. In some example embodiments, some or all of the subsequent processes of method 900 may only be performed on KGD, to eliminate cost of processing on defective interposer die. In some cases, batch processes at the wafer level may be performed on known defective interposer die if the costs of reconfiguration of those processes are greater than or within a negligible threshold of the anticipated cost of processing those known defective interposer die.

At 904, the SMDs 340 may be attached to the interposer die 300, such as by using SMT processes. The SMDs 340 may be attached to interposer die 300 using any suitable mechanism, including, for example, solder bump processes on in-line (e.g., dual in-line, quad in-line, etc.) packages, ball grid arrays (BGAs), or the like. Alternatively, Au bump processes may be used. The SMDs 340 may be attached to the interposer die 300 prior to singulation of the interposer die 300. At this point, the castellated contacts 144 have not yet been formed, as that castellated contacts are formed during the singulation process of the interposer die 300.

At block 906, the wafer 600 may be singulated into individual interposer die 300. The wafer 600 may be attached to saw tape and may be sawed along predefined saw streets between individual interposer die 300. In example embodiments, the castellated contacts 144 may be formed as the singulation may be performed through one or more annular TSVs, as described in conjunction with FIG. 8.

At 908, the image sensor may be attached to the interposer die. This process may be performed while the interposer die 300 is still attached to saw tape. In example embodiments, the image sensor 132 may be attached to the interposer using epoxy. In example embodiments, the image sensor 132 may be attached inset within the cavity 320 of the interposer die 300. Next, at 910 a cure process (e.g., thermal and/or ultraviolet (UV) cure) may be used to cure (e.g., crosslink and/or harden) the epoxy used to attach the image sensor 132 to the interposer chip 110. At 912, wire bonding may be used to electrically connect the image sensor 132 to the interposer chip 110.

At block 914, the lens assembly may be attached to the interposer chip 110. The lens assembly 130 may be attached to the side of the interposer chip 110 over the image sensor 132 as attached by the processes of 908. The lens assembly 130, in example embodiments, may be aligned on-to the interposer chip 110, such as by using a pick-and-place system. The pick-and-place tool may use predefined alignment marks or features on the interposer chip and/or the lens assembly 130 to align the lens assembly 130 to the interposer chip 110. The lens assembly 130, in example embodiments, may be attached using epoxy to the interposer chip 110. At block 916, a cure process (e.g., thermal and/or ultraviolet (UV) cure) may be used to cure (e.g., crosslink and/or harden) the epoxy used to attach the lens assembly 130 to the interposer chip 110.

At block 918, the VCM 140 may be attached onto the interposer chip 110. The VCM may be aligned using a pick-and-place system and may be electrically coupled to the castellated contacts 144 using any suitable mechanism. At 920, a thermal cure may be performed to cure adhesives used in the VCM attachment process. Next, at 922, solder may be used to connect the contacts 142 of the VCM to the castellated contacts 144 of the interposer chip 110.

Figure 10:
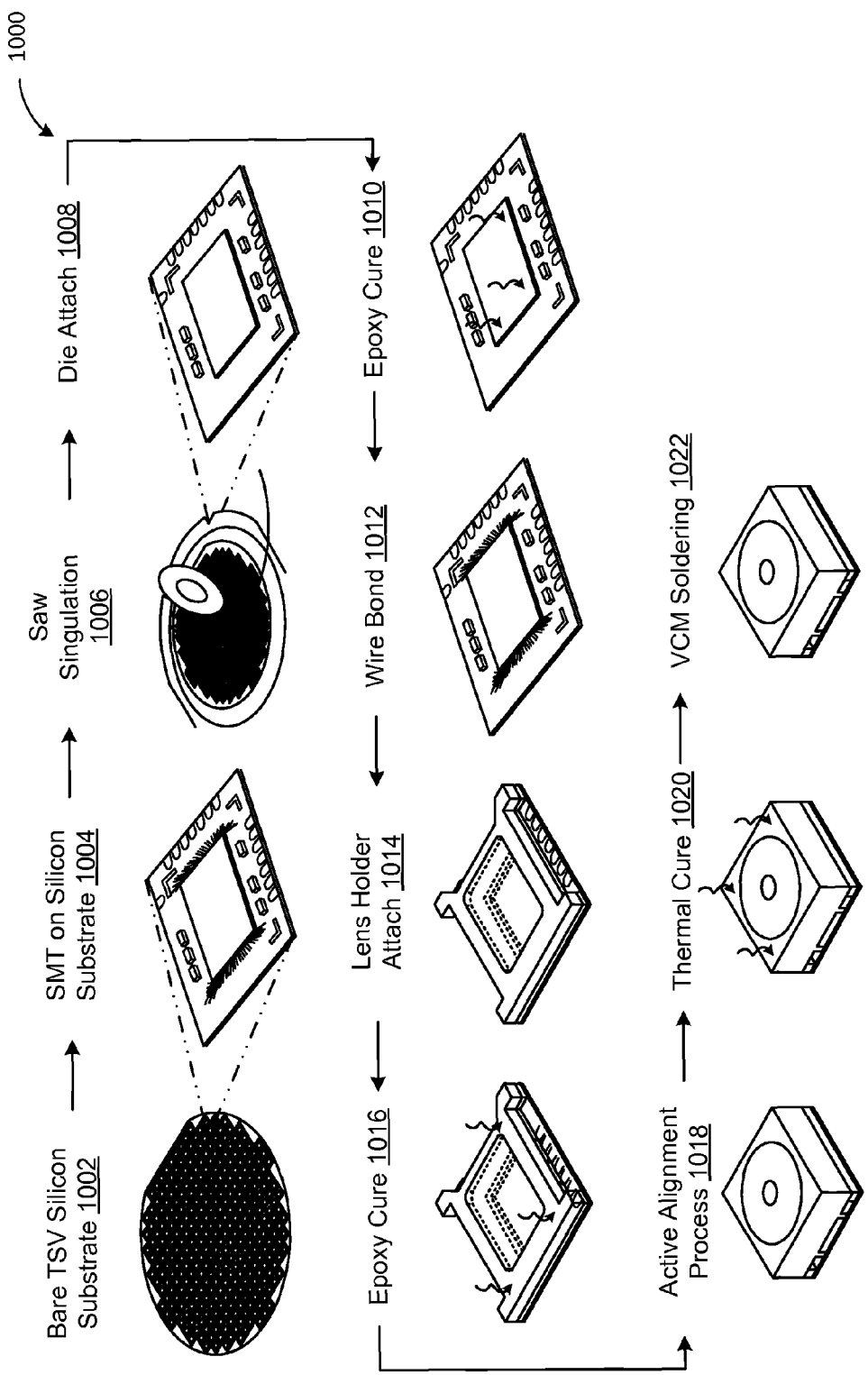
FIG. 10 is a flow diagram of another example method for fabricating the imager assembly with a partially castellated interposer chip as shown in FIG. 4, in accordance with example embodiments of the disclosure.

FIG. 10 is a flow diagram of another example method 1000 for fabricating the imager assembly with a partially castellated 410 interposer chip as shown in FIG. 4, in accordance with example embodiments of the disclosure. The method 1000 may be substantially similar to method 900 except for using interposer die 300 that is partially castellated 410, rather than fully castellated.

Figure 11:
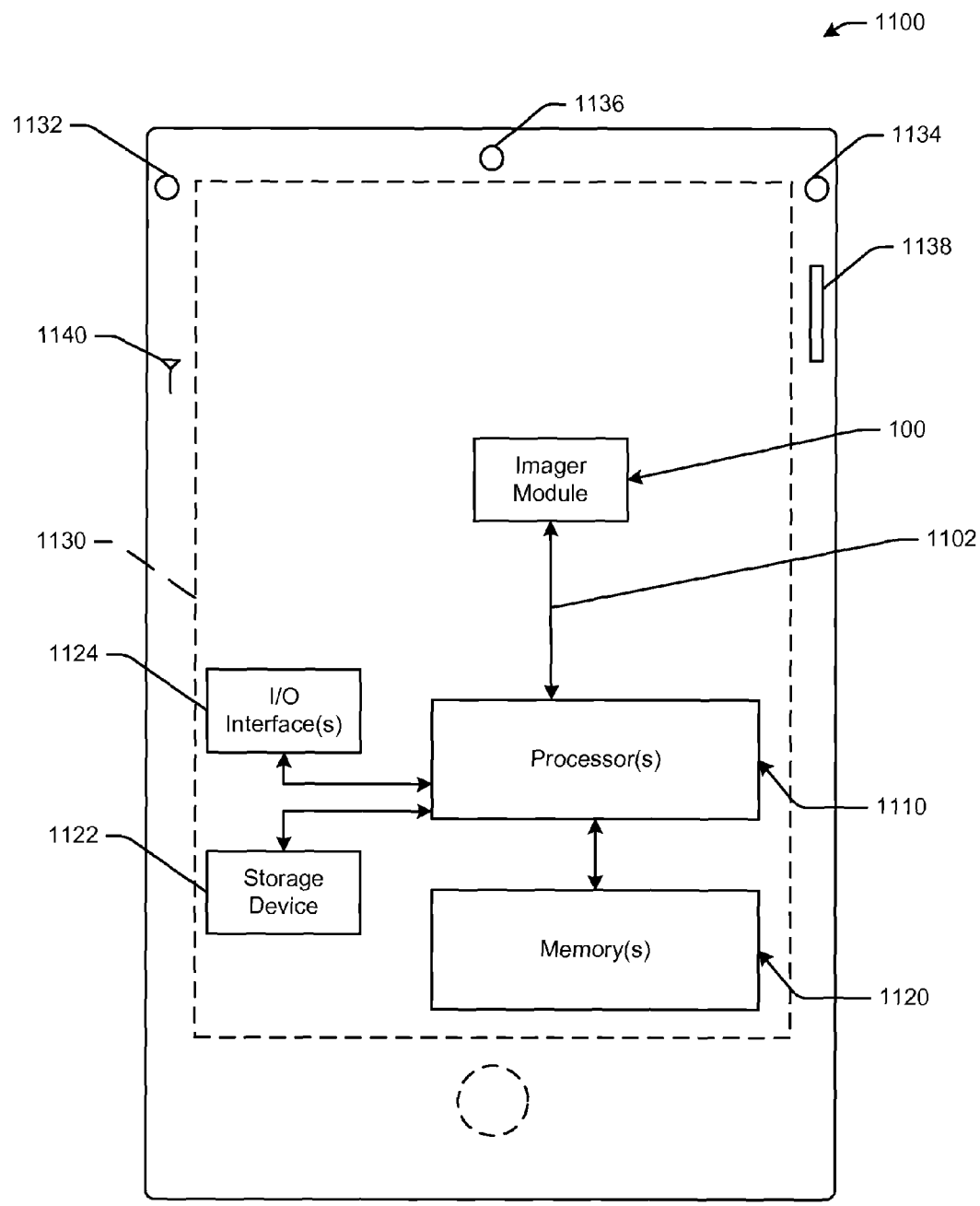
FIG. 11 is a schematic diagram illustrating an example user device with an imager module, in accordance with example embodiments of the disclosure.

FIG. 11 is a schematic diagram illustrating an example user device 1100 with an imager module 100, in accordance with example embodiments of the disclosure. In operation, the user device 1100 may include computer-readable and computer-executable instructions that reside on the user device 1100, as is discussed further below. The user device 1100 may include an address/data bus 1102 for conveying data among components of the user device 1100. Each component within the computing device 1100 may also be directly connected to other components in addition to (or instead of) being connected to other components across the bus 1102.

The imager module 100 may be included within the user device 1100, such as a mobile communications device, a personal electronic device, an imaging system, or any device that may have camera functionality. Indeed, the user device 1100 may be any one of suitable devices that may be configured to capture images. The user device 1100 may include, but is not limited to, a personal computer, a desktop computer, a notebook computer, a laptop computer, a personal digital assistant, an electronic book (ebook) reader, a tablet computing device, a pad computing device, a smartphone, wearable devices, or combinations thereof. The user device 1100 may include one or more application processor(s) 1110 and/or memory 1120 to control and/or direct the capture of image(s) by the imager module 100 and receive image signal(s) corresponding to captured image(s) by the imager module 100.

In some example embodiments, the processors 1110 of the user device 1100 may be implemented as appropriate in hardware, software, firmware, or combinations thereof. Software or firmware implementations of the processors 1110 may include computer-executable or machine-executable instructions written in any suitable programming language to perform the various functions described. Hardware implementations of the processors 1110 may be configured to execute computer-executable or machine-executable instructions to perform the various functions described. The one or more processors 1110 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 1100 may also include a chipset (not shown) for controlling communication between the one or more processors 1110 and one or more of the other components of the user device 1100. The one or more processors 1110 may also include one or more application specific integrated circuits (ASICs) or application specific standard products (ASSPs) for handling specific data processing functions or tasks.

The memory/storage 1120 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, non-volatile magnetoresistive (MRAM), or combinations thereof.

The memory 1120 may store program instructions that are loadable and executable on the processor(s) 1110, as well as data generated or received during the execution of these programs. The memory 1120 may include one or more operating systems (O/S) and one or more application software that may be executed by the processors 1110 to control the user device 1100 and the imager module 100. The memory 1120 may also provide temporary "working" storage at runtime for any applications being executed on the processors(s) 1110. The computer instructions may be stored in a non-transitory manner in non-volatile memory 1120, storage 1122, or an external device. Alternatively, some or all of the executable instructions may be embedded in hardware or firmware in addition to or instead of software.

The user device 1100 may include input/output device interfaces 1124. A variety of components may be connected through the input/output device interfaces 1124, such as a display or display screen 1130 having a touch surface or touchscreen, an audio output device for producing sound, such as speaker(s) 1132, one or more audio capture device(s), such as a microphone or an array of microphones 1134, one or more image and/or video capture devices, such as the imager module 100, one or more haptic units 1138, and other components. The display 1130, speaker(s) 1132, microphone(s) 1134, imager module 100, haptic unit(s) 1138, and other components may be integrated into the user device 1100 or may be separate.

The display 1130 may be a video output device for displaying images. The display 1130 may be a display of any suitable technology, such as a liquid crystal display, an organic light emitting diode display, electronic paper, an electrochromic display, a cathode ray tube display, a pico projector or other suitable component(s). The display 1130 may also be implemented as a touchscreen and may include components such as electrodes and/or antennae for use in detecting stylus input events or detecting when a stylus is hovering above, but not touching, the display 1130.

The input/output device interfaces 1124 may also include an interface for an external peripheral device connection such as universal serial bus (USB), FireWire, Thunderbolt, Ethernet port or other connection protocol that may connect to one or more networks. The input/output device interfaces 1124 may also include a connection to antenna 1140 to connect one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The processor(s) 1110, by executing instructions stored in the memory 1120 and/or storage device 1122 may be configured to control the operations of the imager module 100, as described above. In particular, the processor(s) 1110 may be configured to provide the imager module 100 with one or more control signals via the PCB 120 and interposer chip 110 to the VCM 140. The processor(s) 1110 may further be configured to cause the image sensor 132 of the imager module 100 to capture an image and further receive, process, display, such as on the display screen 1130, and/or store, such as in memory 1120 or storage device 1122, the image data.

Various other changes and modifications to the embodiments herein chosen for purposes of illustration will readily occur to those skilled in the art. For example, certain materials for the purposes of bonding and/or castellated contact formation were described, but other materials may also be effective. Further additional intervening layers may be able to be provided while still benefiting from the explained embodiments. Examples were described to aid in understanding. Thus, it was not intended that these examples were the only examples. To the extent that such modifications and variations do not depart from the spirit of the invention, they are intended to be included within the scope thereof. It will be readily understood to those skilled in the art that various other changes in the details, material, and arrangements of the parts and method stages which have been described and illustrated in order to explain the nature of this disclosure may be made without departing from the principles and scope of the disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A mobile device, comprising:
    an interposer with a first side and an opposing second side and an edge, wherein the interposer further includes a first set of bond pads on the first side, a second set of bond pads on the second side, and a plurality of castellated contacts on the edge;
    a lens assembly including one or more lenses disposed on the first side of the interposer;
    an image sensor electrically coupled to the first set of bond pads and disposed such that one or more photosensitive pixels of the image sensor are configured to receive light through the lens assembly and wherein the image sensor is configured to generate image data corresponding to light sensed by the photosensitive pixels of the image sensor;
    a voice coil motor (VCM) mechanically coupled to the lens assembly and electrically coupled to the castellated contacts, wherein the VCM is configured to receive a VCM control signal and actuate the lens assembly; and
    a printed circuit board (PCB) electrically coupled to the second set of bond pads of the interposer, wherein the second set of bond pads are configured to receive the VCM control signal from the PCB, wherein the interposer is configured to route the VCM control signal to the castellated contacts, and wherein the interposer is further configured to route image sensor data from the first set of bond pads to the second set of bond pads.

2. The mobile device of claim 1, wherein the interposer includes a third set of bond pads on the first side, the third set of bonds pads electrically coupling one or more surface mount devices (SMDs) to the interposer.

3. The mobile device of claim 1, wherein the castellated contacts include copper contacts separated from a silicon bulk material of the interposer by a diffusion inhibiting layer to prevent metal diffusion into the silicon bulk material and wherein VCM contacts are soldered to the copper contacts.

4. The mobile device of claim 1, wherein the interposer includes a recessed region on the first side and the image sensor is disposed in the recessed region and wherein the image sensor is coupled to the first set of bond pads using wire bonds.

5. A method, comprising:
    forming an interposer die having a first side, an opposing second side and an edge, wherein the interposer die includes a first set of bond pads on the first side, a second set of bond pads on the second side, castellated contacts on the edge;
    singulating the interposer die from a substrate;
    attaching an image sensor onto the first side;
    electrically coupling the image sensor to the first set of bond pads;
    attaching a printed circuit board (PCB) onto the second set of bond pads; and
    attaching an electromechanical device to the castellated contacts.

6. The method of claim 5, further comprising attaching one or more surface mount devices (SMDs), prior to singulating the interposer die, to a third set of bond pads disposed on the first side of the interposer die.

7. The method of claim 5, further comprising forming a recessed region within the interposer die, wherein attaching an image sensor onto the first side comprises placing the image sensor in the recessed region, and wherein electrically coupling the image sensor to the first set of bond pads comprises wire bonding electrical contacts of the image sensor to the first set of bond pads.

8. The method of claim 5, further comprises forming a through silicon via extending from the first side to the second side and configured to propagate image data from the first set of bond pads to the second set of bond pads.

9. The method of claim 5, wherein forming the castellated contacts include forming copper contacts separated from a silicon bulk material of the interposer die by a diffusion inhibiting layer and wherein attaching the electromechanical device to the castellated contacts further comprises soldering contacts of the electromechanical device to the copper contacts.

10. The method of claim 5, wherein the castellated contacts each have a width of about one millimeter or less.

11. The method of claim 5, further comprising attaching a lens assembly to the first side of the interposer die, wherein the lens assembly is mechanically coupled to and movable by the electromechanical device.

12. The method of claim 11, wherein the interposer die is configured to
    receive, via the PCB, a control signal; and
    provide, via the castellated contacts, the control signal to the electrometrical device to move the lens assembly.

13. The method of claim 5, wherein forming an interposer die further comprises:
    forming an annular opening through the interposer die extending from the first side to the second side, wherein the annular opening has a sidewall extending from the first side to the second side and an inner plug of silicon;

depositing a diffusion inhibitor material on the sidewall;
plating metal to fill or partially fill the annular opening; and
removing the inner plug to form an annular via,
wherein singulating the interposer die from the substrate comprises sawing through the annular via to form the castellated contacts.

14. The method of claim 13, further comprising bonding the interposer die to a carrier wafer, the bonding surface having a copper seed layer, wherein plating metal comprises electroless plating copper using the copper seed layer.

15. An imager module, comprising:
an interposer with a first side, an opposing second side and an edge with a castellated contact;
an image sensor electrically coupled to the interposer on the first side such that the image sensor is configured to receive light and generate image data corresponding to the light;
a lens assembly including one or more lenses disposed on the first side and configured to pass light to the one or more photosensitive pixels;
an electromechanical device mechanically coupled to the lens assembly and electrically coupled to the castellated contact, the castellated contact including a first contact separated from a silicon bulk material of the interposer by a diffusion inhibiting layer; and
a printed circuit board (PCB) electrically coupled to the interposer on the second side, wherein the interposer is configured to receive image sensor data from the image sensor and provide the image sensor data to the PCB.

16. The imager module of claim 15, wherein the PCB is configured to route control signals to the electromechanical device via the interposer.

17. The imager module of claim 15, wherein the first contacts a copper contact and wherein an electromechanical device contact is soldered to the copper contact.

18. The imager module of claim 15, wherein the interposer has a first bond pad on the first side and a second bond pad on the second side and wherein the interposer die is configured to route image data from the first bond pad to the second bond pad.

19. The imager module of claim 15, further comprising a through silicon via extending from the first side to the second side and configured to propagate image data from the first side to the second side.

20. The imager module of claim 15, wherein the interposer includes a recessed region on the first side and the image sensor is disposed in the recessed region.

* * * * *